United States Patent
O'Neill

(10) Patent No.: US 10,425,593 B2
(45) Date of Patent: Sep. 24, 2019

(54) DIGITAL IMAGE FILTERING AND POST-CAPTURE PROCESSING USING USER SPECIFIC DATA

(71) Applicant: PAYPAL, INC., San Jose, CA (US)

(72) Inventor: Megan Marie O'Neill, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/788,601

(22) Filed: Oct. 19, 2017

(65) Prior Publication Data

US 2019/0124272 A1    Apr. 25, 2019

(51) Int. Cl.
*H04N 5/232*    (2006.01)
*H04N 5/72*     (2006.01)
*H04N 5/262*    (2006.01)

(52) U.S. Cl.
CPC ....... *H04N 5/2621* (2013.01); *H04N 5/23222* (2013.01); *H04N 5/23229* (2013.01); *H04N 5/23293* (2013.01); *H04N 5/72* (2013.01)

(58) Field of Classification Search
CPC ............ H04N 5/2621; H04N 5/23222; H04N 5/23229; H04N 5/72; H04N 5/23293
See application file for complete search history.

(56) References Cited

U.S. PATENT DOCUMENTS

| | | | |
|---|---|---|---|
| 2009/0231441 A1* | 9/2009 | Walker | G06F 17/30265 348/207.1 |
| 2011/0211753 A1* | 9/2011 | Lee | H04N 1/00196 382/164 |
| 2011/0213795 A1* | 9/2011 | Lee | G06F 17/3028 707/769 |
| 2011/0292221 A1* | 12/2011 | Gu | H04N 5/23222 348/207.1 |
| 2012/0092515 A1* | 4/2012 | Yim | G06F 17/30247 348/222.1 |
| 2014/0176732 A1* | 6/2014 | Cohen | H04N 13/122 348/207.1 |
| 2016/0100101 A1* | 4/2016 | Cohen | H04N 13/122 348/207.1 |
| 2016/0232426 A1* | 8/2016 | Wang | G06K 9/4652 |
| 2017/0208245 A1* | 7/2017 | Castillo | H04N 5/23222 |

* cited by examiner

*Primary Examiner* — Hung H Lam
(74) *Attorney, Agent, or Firm* — Haynes and Boone, LLP

(57) ABSTRACT

There are provided systems and methods for digital image filtering and post-capture processing using user specific data. A computing device may include a camera that records media of a scene, including images or videos. A user may utilize the computing device to add filters, graphical overlays, or other effects to the recorded media, which may alter pixel data for pixels of the media or blend graphics into the media. When adding image effects to images, the device or a service provider that offers and image hosting and/or sharing platform may determine recommendations for particular image effects to use when recording and processing the image. The recommended effects may be based on effects used in past media, as well as user information, and may change an appearance of the output media in a particular way specific to the user, media, and/or scene.

20 Claims, 6 Drawing Sheets

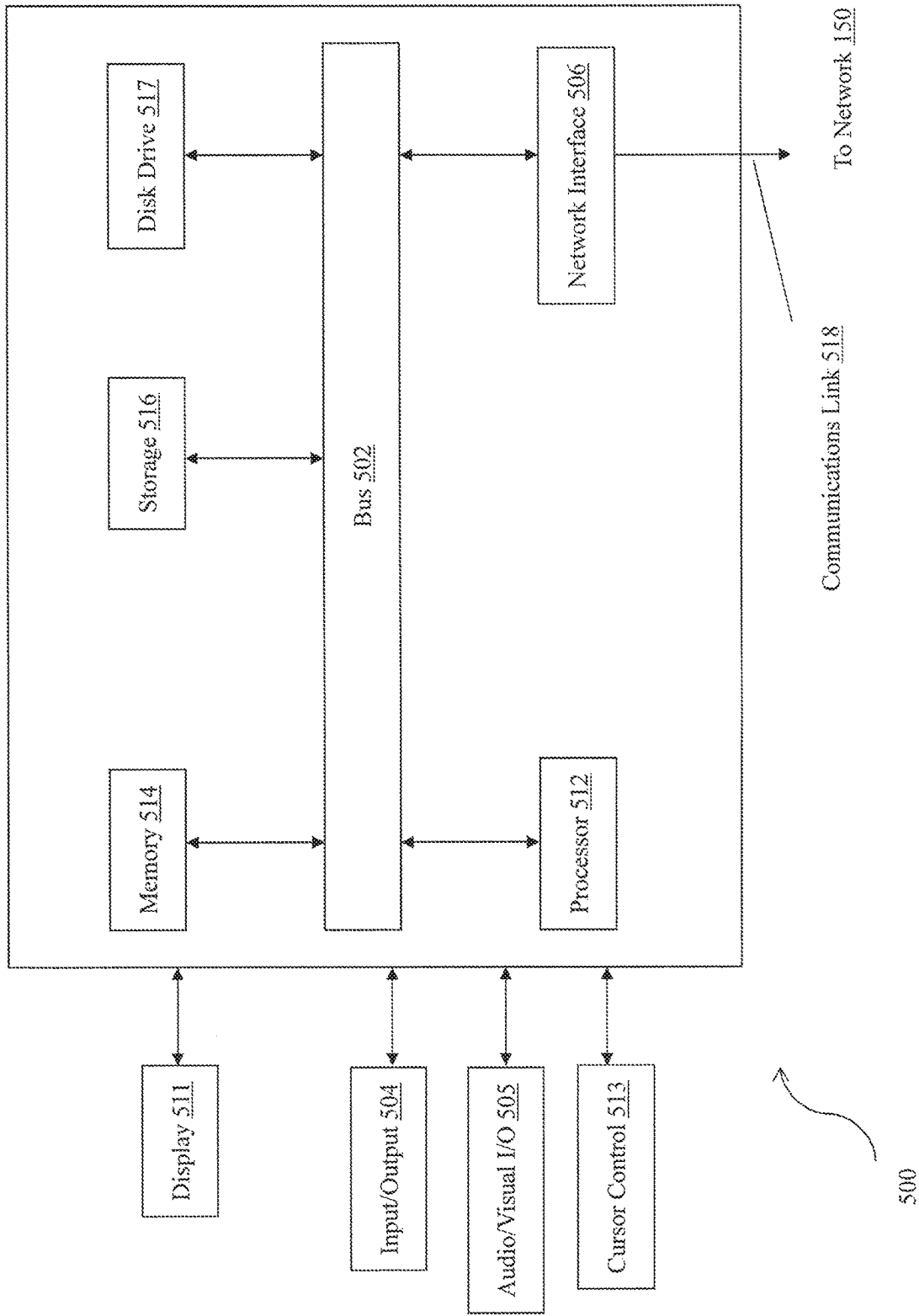

DIGITAL IMAGE FILTERING AND POST-CAPTURE PROCESSING USING USER SPECIFIC DATA

TECHNICAL FIELD

The present application generally relates to recording and/or processing digital images and more specifically to utilizing crowd-sourced, location specific, and/or user specific data to filter digital images prior to capture and perform post-image processing.

BACKGROUND

Image or other media recording and processing mobile computing devices have become widespread and are used nearly daily by many users. As the miniaturization of mobile devices increases and becomes more prevalent, a larger amount of media capture, storage, and processing is performed on-device. However, media hosting, editing, and sharing platforms still provide popular online resources for users to interact with other users, share their images or videos, and view other users' media. When sharing media, users often look for popular media captured by other users, or attempt to capture something that other users will find interesting. For example, trend-setting users may record media that is new and interesting, and causes a high level of user views, interactions, and/or follower retention. These types of popular media not only provide an increase in distribution and consumption of the media by other users, but may also serve to drive financial considerations of the sharing user, who may receive revenue from sharing highly viewed content. However, the user that wishes to create new and interesting media content is relied upon to determine potentially trending or popular media. Devices and media sharing platforms do not provide assistance to the user in identifying what may be popular and trending, or what field of media and/or recorded scenes may be overly saturated. Thus, users may record and process images without identifying advantageous media capture information, which may not drive Internet traffic to the media.

BRIEF DESCRIPTION OF THE DRAWINGS

FIG. 5 is a block diagram of a computer system suitable for implementing one or more components in FIG. 1, according to an embodiment.

Figure 1:
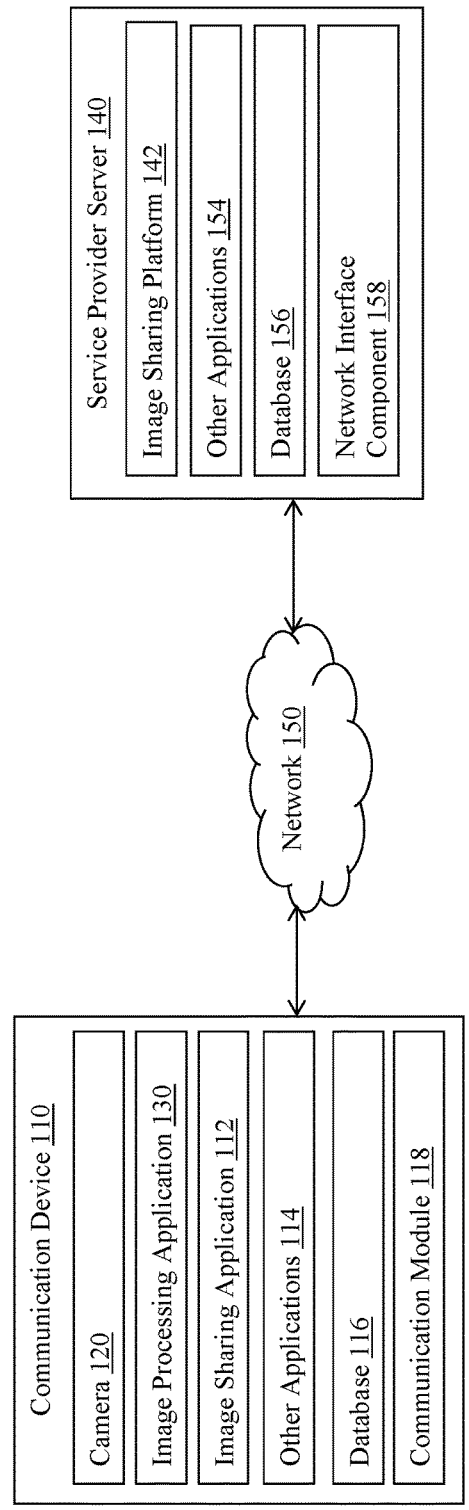
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for digital image filtering and post-capture processing using user specific data. Systems suitable for practicing methods of the present disclosure are also provided.

Computing devices may include functionality to capture images or videos using a camera or other media capture device associated with the device. For example, digital cameras, mobile smart phones, tablet computers, digital video recorders, gaming systems including mobile gaming systems, and other types electronic devices are capable of capturing media of a scene, including images having representations or portrayals of items, objects, persons, or other real-world physical articles. Media data or media content captured of a user may correspond to still images, videos, and/or other visual content of a user, and may be referred to as an "image," "video," or more generally media. Although the terms "image," "video," or the like may be used throughout, it is understood that other forms of data may also be captured, including infrared image data, x-ray data, or other types of media that may be detected by an imaging device, such as a camera, infrared sensor, photodetector, etc. Media data of a user may be captured during use of the computing device. For example, a camera of a computing device may capture an image or video selected by a user through directing the camera at a scene. The user may view a representation of the scene through a viewfinder, which may correspond to an optical viewfinder that allows for passage of light or other electromagnetic radiation, where the optical viewfinder is substantially is pointed towards the scene and allows for imitation of captured media of the scene, and/or through a digital viewfinder that outputs signals received from a digital camera sensor. Thus, in certain embodiments, the camera may include a device that includes a viewfinder having an output display that is used with an optical viewfinder and an exposure camera that uses light sensitive film. In such embodiments, the exposure camera may include one or more optical lenses or filters displaced prior to the light sensitive film that alters and adjust incoming light radiation prior to hitting the light sensitive film.

However, in other embodiments, the optical imaging and/or capture device associated with the computing device may correspond to a digital camera, where the digital camera includes one or more lenses to allow passage of electromagnetic radiation and an array of photosensitive sensors on a substrate that detects the electromagnetic radiation and converts the wave/signal for the electromagnetic radiation into one or more digital values that are used to represent the incoming radiation (e.g., incoming light). In such embodiments, the array may include one or more sensor elements that detect the incoming radiation and provide image data corresponding to pixels as image elements that make up a digital representation of an image (or many images in the case of a video). In this regard, the digital camera may include one or more lenses, radiation or light filters, and/or other optical characteristics that may alter or change the incoming electromagnetic radiation prior to being detected by the array or other sensor if the device, for example, by filtering certain wavelengths. The digital camera may also include one or more post-processing image processing techniques, which may adjust pixel value within a captured image (or series of images, such as a video), add graphical objects or blend images, and/or otherwise change a captured image. The digital camera may be included in a mobile computing device, such as a traditional direction digital camera of a mobile device, a forward facing camera of the mobile device, and/or a camera with a tablet computer or personal computer, or may correspond to a digital camera independent of another computing device. The camera may be capable of capturing data of a scene that the camera is pointed at, which may be in a traditional camera direction or mounted in such a position to capture the user using the device, such as a "selfie" or personal picture of a user captured with a forward facing camera of a mobile phone.

Thus, a user may utilize the camera to capture an image of a scene. The user's device including or associated with the camera may record or take media capture data, which may correspond to recorded media data, for example, an image or video after a user selects a button or process to record incoming electromagnetic radiation of a scene, or may correspond to pre-capture data displayed in or recorded by a viewfinder, such as a display of incoming electromagnetic radiation output in an interface of a display screen component of a digital camera. For example, the images, videos, or other media data may be stored to the device from media data that has been previously captured (e.g., in an image library) or may be available from data retrieved or accessible through an online resource, including social networking platforms, media sharing resources, and/or email/messaging services. Media data stored to a computing device may include a library of images/videos or data stored to and/or accessible by one or more applications on the device. Conversely, pre-recorded media capture data may correspond to data being actively output and displayed by the device prior to recording of the media data (e.g., recording of the incoming electromagnetic radiation of the scene), and may be processed as the data is incoming to the device and/or streamed (e.g., in real-time) to a service provider for processing.

Media data may therefore include a representation or portrayal of a scene, including objects in the scene. Media data, such as a still image or video, may also include a representation, portrayal, or likeness of one or more users, such as facial data and/or body data of the user(s). Additionally, in other embodiments, audio data, or audiovisual data, may also be captured that includes audio data of the scene and/or the user(s). Thus, as discussed herein, the media capture data may correspond to a single image, or may be a plurality of images, such as a video having multiple frames or still images, and may be recorded or may be displayed in an interface or viewfinder for recording. The additional media capture information may include sounds and voice cues, background or ambient noise, biometrics (e.g., fingerprint, heart rate, retinal scan), geo-location(s) (e.g., detected by a GPS component of the device at the time of the media capture data), and/or other data or metadata that may attach to an image, a video, or displayed media capture data prior to recording. Such additional information may be captured by a communication device, such as a mobile phone, or a connected device, such as a wearable communication device.

An application on the computing device may display the media capture data, which may be displayed in an interface corresponding to a viewfinder and/or a media capture application (e.g., camera roll or library of stored images). In other embodiments, the media capture data may be displayed from media stored to an online resource and/or service provider, which may be uploaded by the computing device or another device, and may be downloaded and displayed in one or more applications executing on the device, such as a web browser application or a dedicated application of the resource/service provider. In other embodiments, the application may instead be one or more subroutines in one or more libraries shared between multiple applications that may be executed by the application when viewing media data and content and/or attempting to capture new media data. The media capture data may be processed by the computing device to determine any potential filters, graphics, or other effects to apply to the media capture data prior to recording of media content, which may then result in media content having the effect. In such embodiments, the media capture data may be processed directly by the computing device on detection of the media capture data by the camera or viewfinder, for example, as a digital camera detects the incoming electromagnetic radiation on a substrate having the array of sensor, or may be streamed to a service provider for processing. However, in other embodiments where the media capture data may correspond to a recorded or captured image (or video), which may be stored to the computing device and/or uploaded by the computing device to an online resource/service provider, the media capture data may be retrieved by the computing device and processed by the computing device or service provider.

The media capture data may be processed to determine a recommendation for a filter, effect, and/or graphic to be applied to media capture data (e.g., prior to recording of the associated media content/data or post-processing with previous recorded media content/data). An effect may correspond to some imaging technique that may change or alter recorded media. Thus, the effect may correspond to a pre-capture effect applied to incoming electromagnetic radiation that alters the reception of the radiation, or a post-capture processing that adds or changes an appearance of captured data. In order to determine the recommendation, the application processing the incoming media capture data may utilize one or more other images or videos, including media captured by the user and/or other users, to determine a recommendation for an effect to apply to the media capture data. The other media data may include one or more effects used on or with the media data, as well as other associated metadata including user name, identifiers, hashtags, a location, and/or identified content in the media. In certain embodiments, the application may utilize popularity and/or trending ratings to determine what effect is being used in media, and how often the effect is being used. For example, one or more effects may be used in previously captured and recorded media by the user associated with the computing device and/or other users.

A popularity rating or trending rating may be associated with each individual effect, and may correspond to a numerical value, such as a number of times the effect is used. The rating may be weighed by time so that more recent uses are given more weight in the score or value. In other embodiments, the popularity or trending rating may also weigh certain sharing users of the media data more heavily, such as users with large followers, many media shares, large libraries, and/or famous/trend setting users (e.g., celebrities, artists, photographers, etc.). Thus, a popularity rating or a trending rating may correspond to a score, value, or other quantifier for a media effect that indicates a parameter of usage of the media effect by other users and/or in other media content. In one example, a rating may be high for an effect, such as a sepia tone filter or steam graphical overlays, that is used by many users, where as a low rating or a new and unused rating may be applied to effects not often used or unused, including new effects provided by new applications/processes or application/process updates.

The rating may be dependent on the followers and/or followed accounts/users by the user capturing the media capture data, for example, by determining the rating using those accounts/users and limiting the rating calculation to only those accounts/users of importance to the user. The rating may also be dependent on a number of unique uses, for example, in different media and/or by different users. Thus, the usage of one or more effects may be determined across a range of users and/or media and may be crowd-sourced using the various users/accounts using the media capture or post-processing effect(s). Multiple ratings may be determined for multiple available media effects, including a portion or all of the media effects available to the computing device and/or service provider for use with the media capture data. Thus, determination and/or retrieval of the ratings may be limited to those effects available to the computing device/service provider.

In various embodiments, the rating may be determined by mining one or more media sharing feeds, posts, or timelines to extract data used to determine the popularity or trending rating of one or more effects in images. For example, the rating may be based on likes, comments, shares, mentions, and/or follows with respect to particular media data including the effect. The rating be determined using additional data that determines a popularity or trend of use of the effect with media content. The rating may also be scene and/or media specific, so that the rating is particular to the media capture data for the user. For example, the media capture data may be processed using image recognition to identify one or more of a user, a location, an environment, and/or an object in the media capture data. Search for popularity ratings or trending ratings for effects may be limited to media data having the same or similar user(s), location(s), environment(s), and/or object(s). For example, media capture data having an image of a coffee cup at a coffee shop may be used to search for effects that are used on the same coffee cup or at the same coffee shop, or with similar media content of coffee cups and coffee shops. Thus, metadata for the image capture data may also be used to search for and/or determine effects and their corresponding popularity/trending ratings, where the effects may be used with the image capture data.

Once one or more effects are determined for the image capture data using image effects used in past or previously captured media, a recommendation for the effects may be determined by the application/processes executed by the computing device or service provider. The recommendation may recommend or suggest at least one of the effects for use with the media data based on the rating of the effect crowd-sourced from the other users, accounts, and media shared on the service provider and/or based on effects previously used by the user with other media. For example, the recommendation may be for a commonly or often used effect based on the data from the other images where the effect may inform the user of popular, trending, or past used effects. Conversely, if the recommendation is for new and unique effects, the recommendation may be for an effect that is not widely used, popular, or trending, which may provide the user with a unique effect to use with the media capture data. In various embodiments, the recommendation may be determined based on a likelihood of conversion of browsing users of a stream of media content into viewers of the media capture data and/or of followers of the user and/or user's account recording the media capture data. Thus, a recommendation may be to provide the user with one or more popular or trending effects, or may inform the user of new and unique effects. Multiple recommendations may be determined so that the recommendations may be displayed with their corresponding different effects, and the user may choose an effect based on the recommendation that matches their needs or interests.

In various embodiments, the recommendation may be determined using nearby devices to the computing device recording and/or processing the media capture data, or nearby a location of the media capture data (e.g., when the media capture data correspond to an image or video captured at some time in the past). The nearby devices may have corresponding media content generation for the same or similar scene as the media capture data. Additionally, the nearby devices may utilize an effect with the generated media content, such as a filter, graphical overly, or blending with a stored graphic. The media effect data for the effects used by the nearby devices may be provided to the computing device or service provider for determination of the recommended effect, which may then be location-specific to the location of the media capture data and/or a predetermined or set proximity range or area around the location. The media capture data may be processed to determine the location, for example, using object/user recognition in the image and/or metadata of the image. Thus, the effect recommendation may be determined using content within the media capture data of the scene, including any metadata associated with capture/recording of an image or video. For example, a location (e.g., GPS coordinates, check-in location, network or IP address associated with a fixed location device, etc.) of the media capture data may be provided with the media capture data, or may be determined using the media capture data. The nearby devices to the computing device may be identified using the geo-location of the computing. In other embodiments, the computing device may communicate with nearby devices using device-to-device communications, which may be used to receive media content from the other devices and/or effect information for media effects used by the other devices with media content. The device-to-device communications may include communications over a shared network access point, such as a WiFi router, or based on short range wireless communications (e.g., Bluetooth, BLE, LTE Direct, WiFi, NFC, etc.) communications between the devices. Thus, the effects used in media content of the same or similar scene and/or at the same or similar location may be crowd-sourced across nearby devices and their recorded media content, which may be temporally related to the time of recording of the media capture data. The recommended effect may then be determined based on the same or similar effect used by the other nearby devices, or may correspond to a new or unique effect not used, rarely used, or not recently used by the nearby devices.

Additionally, the effect recommendation may be determined based on other data. User preferences and/or information may be used to determine the effect recommendation, which may or may not be used with the aforementioned information. In this regard, user preference may indicate whether the user would prefer trending or popular effect recommendation, or would prefer new and unique effects not used, rarely used, or not recently used by other users in media data, including the same or similar media data. Other user preferences may be to match effects to certain users and/or media (e.g., trending users, friends, family, social networking connections, and/or popular users), weights used to determine a popularity rating, and/or weights for particular types of effects. The user information may also correspond to an experience level or rating of the user with use of effects for media data, including the user's experience with using the device application for capture/processing of media data and/or the online service provider. For example, a user that is not experienced in using the application/service provider to edit media data may wish to see popular effects that other users like as an entrance or gateway to learning media editing and effect use. Conversely, an experienced user may wish to view new and unique effects as it may be assumed that the experienced user can search for, use, and view the popular media effects. The experience level may also indicate a length of instruction output with the recommendation for use of the media editing effect. In various embodiments, the user information may also include information on past usage of media editing effects, including those effects used in previously captured images by the user. Thus, the recommendation may be for a media effect that matches or is associated with the past used media effects, for example, to make a portfolio of captured media stylistically coherent and similar.

The recommendation may be output in a user interface with the instructions. In various embodiments, the recommendation may be output with an interface alert element that tags or highlights the effect recommended with the recommendation, for example, a highlight of the effect in the interface. The recommendation may include data that caused generation of the recommendation, such as the popularity of the effect, number of uses, past uses, and/or similar media data. The recommendation may be displayed with the media capture data in an interface of the computing device, such as a viewfinder interface displaying pre-capture data of a scene or an interface of an application accessing previously captured data for display and editing by the user. The effect recommendation may be generated as a notification that includes text and/or audio instructions. The instructions may assist the user in how to use or apply the effect, and may provide areas within the media capture data for application of the effect. The recommendation may also allow the user to view sample media data using the effect.

In various embodiments, the recommendation may also or instead include a recommendation for a hashtag identifier, title, or description to be used with the media capture data. The hashtag identifier may correspond to an identifier used to link the media capture data to a group of the same or similar media data, or may correspond to a new and/or unique hashtag identifier to separate the media capture data from a group a media data. The hashtag identifier, title, or description may be determined similar to determination of the effect, as discussed herein. Other recommended data may include instructions of how or where to capture data, which may be synchronized to be the same or similar to other media data of the scene, or may guide the user of other content to capture from the scene that is not the same or similar to other media data of the scene. Such instructions may be output as directional indicators, text, and/or audio. The instructions may also be output as an augmented reality that blurs, highlights, or otherwise shows that content to capture from the scene in a viewfinder interface displaying the media content data. The recommendation may display the additional data with the media capture data in the application interface on the computing device.

In various embodiments, the media effect recommendation and/or image processing may occur after recording the media, for example, once an image or video is stored to the user's device or uploaded to an image hosting, editing, and/or sharing platform, such as an online resource. As previously discussed, the media capture data may correspond to stored data on the computing device or with another entity, such as another device, a networked server, or a cloud computing architecture of an online resource. Thus, the media capture data may correspond to actual captured and recorded media, such as a stored and/or uploaded image or video. The service provider may therefore correspond to an image hosting, sharing, and/or editing platform allowing the user to access the platform using the computing device and perform editing of the stored media content as discussed herein.

After processing the media capture data with the effect, the user may view the altered or changed media capture data. The user may further change the effect if desired, and may request a new recommendation, which may be determined by omitting the previous recommended effect and determining a new recommended effect as discussed herein. Once the user is satisfied with the effect, the user may capture media data having the effect or may edit the previously captured data with the effect. The new media data having content that is edited and changed using the effect may then be stored to the device and/or uploaded to the service provider. The service provider may use the media data with the effect to determine recommendations for one or more other devices and/or users.

Thus, using the processes described herein, image (or any media) editing may be improved by providing contextual relevant and useful image effects and processing. Such editing processes allow users to adjust the content and output of media data, and create new and interesting media data. By improving editing tool use, display, and user interface integration, users may more easily edit media data and generate content, which may provide time savings over traditional methods of media editing and content generation. Moreover, utilizing the processes provided herein, devices and online service providers may provide solutions to user integration with media capture and/or editing systems, which may assist in onboarding users to new applications and processes, and retainer users. This may further assist in driving traffic both to the application/service provider, and to particular shared media on an online platform. Such processes therefore improve image capture processes and post-capture processing, or more generally any media processing, by providing image editing tools and processes using contextual data.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110 and a service provider server 140 in communication over a network 150. The user (not shown) may utilize communication device 110 to utilize the various features available for communication device 110, which may include processes and/or applications executed by communication device 110 for capture and/or editing of media with one or more media effects that change an appearance or output of the media. Communication device 110 may include components to capture media data, such as images, videos, or other audio, visual, or audiovisual content, of a user when the user uses communication device 110. Communication device 110 may provide recommendations for media effects to user with captured media data, which may be determined by communication device 110 and/or service provider server 140. After editing media data, the media data may be stored to communication device 110, uploaded to service provider server 140 for hosting and/or sharing on an online platform, and provided to another device.

Communication device 110 and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with service provider server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data. Communication device 110 may include or be associated with a camera 120, which may be physical contained, embedded, attached to, or included with communication device 110. In certain embodiments, camera 120 may be external to communication device 110 and provide input data to communication device 110 (e.g., through a wired connection or wireless connection over short range wireless communications or a network). Although only one communication device is shown, a plurality of communication devices may function similarly.

Communication device 110 of FIG. 1 contains camera 120, an image processing application 130, an image sharing application 112, other applications 114, a database 116, and a communication module 118. Image processing application 130, image sharing application 112, and other applications 114 may correspond to executable processes, procedures, and/or applications with associated hardware. In other embodiments, communication device 110 may include additional or different modules having specialized hardware and/or software as required.

Camera 120 corresponds to an optical device of communication device 110 enabling a user associated with communication device 110 to capture or record images, including still and/or video images. Camera 120 may correspond to a digital camera on communication device 110 (e.g., incorporated in communication device 110 such as a mobile phone's digital camera in a traditional camera orientation and/or a forward facing camera orientation that captures one or more users as they use and view a display screen of communication device 110) or associated with communication device 110 (e.g., connected to communication device 110 but incorporated within a body or structure of communication device 110), or may more generally correspond to any device capable of capturing or recording an image, video, or other digital media data, including infrared imaging or other types imaging devices. As a digital camera, camera 120 may include a sensor array disposed on a semiconductor substrate having a plurality of photosensitive elements configured to detect incoming light. In other embodiments, other types of electromagnetic radiation sensors may be used, including infrared sensitive sensors/elements and the like. In other embodiments, camera 120 may correspond to a traditional exposure camera, which may include a lens and shudder to allow incoming electromagnetic radiation to be recorded on light sensitive film. In such embodiments, camera 120 may utilize communication device 110 to receive recommendations on effects, such as filters, lens, and/or zoom, to apply to incoming light prior to being recorded on photo sensitive film.

Camera 120 may include various features, such as zoom, flash, focus correction, shutter speed controls, or other various features usable to capture one or more images or videos of the user and/or other users or objects. Camera 120 may include other media capture components, including a microphone to capture audio data and/or a touch element or screen that captures a biometric. Camera 120 may further display a preview and/or captured image to the user through another device of communication device 110, such as a viewfinder, screen (e.g., mobile phone touch screen, tablet touch screen, and/or personal computer monitor), or other display. Camera 120 may interface with one or more applications of communication device 110 to capture media data, such as images/videos, which may be used to determine one or more effects to apply prior to recording media data and/or perform post-processing of recorded media. Camera 120 may also be used to capture media data that is processed to determine reference data points or nodes for use in future facial recognition processes. Image processing application 130 may therefore use camera 120 to capture media data, which may be processed to determine reference media data for facial recognition processes of image processing application 130, or may be processed with reference media data to determine an identity of a user.

Image processing application 130 may include one or more processes to utilize devices of communication device 110 to receive media data from camera 120 and capture media data, including applying effect prior to or during the recording of media data, and/or process recorded media to add image effects. In this regard, image processing application 130 may correspond to specialized hardware and/or software utilized by communication device 110 to first receive media data from camera 120, which may include one or more images or videos. The media data may correspond pre-recorded data being currently detected by camera 120, or may correspond to recently captured media content, such as an image of video that was captured by communication device 110 using camera 120 and displayed in response to the recording of the media. In other embodiments, the media data may be accessed from stored media data, for example, media data stored to database 116 and/or service provider server 140. Image processing application 130 may display the media data in a viewfinder, a post-recording interface, and/or a video library. The media data may also be displayed with controls for recording the media data, deleting the media data, storing the media data to one or more databases including database 116 and/or database 146, uploading or downloading the media data, and/or adding an effect to the media data, including zoom controls, lens filters, color filters, graphical overlays, graphic blending and/or addition, or other effect.

In this regard, once the media data is received, image processing application 130 may process the media data to determine one or more recommendations on use of an effect in the media data. In other embodiments, the media data may be provided to service provider server 140 for determination of the recommendation and/or to receive past media effect data for effects used in media data having the same or similar content. Thus, one or more of the processes discussed herein that are performed by image processing application 130 may also or instead be performed by service provider server 140. In order to determine a recommendation, the past image effect data may be used to determine effects used in other media, and provide a recommendation for one or more effects. The recommendation may be for a popular or commonly used effect, or for a unique, not recently used, or new effect. Thus, multiple recommendations may be determined in certain embodiments, where each recommendation is for a different effect and based on a different triggering condition or data to cause the recommendation.

Moreover, the recommendation(s) for one or more effects may be made more particular to the media data processed by image processing application 130 using additional data. The recommendation may be determined a current location detected by communication device 110 (e.g., GPS data/coordinates) at the time of the media data, and may be used to determine nearby devices and media data captured by those devices. Effects used by the nearby devices in their respective recorded media may be received by image processing application 130 using local connection with the nearby devices, for example, through device-to-device communications including using short range wireless communications, or may be received from service provider server 140 based on the detected geo-location. The content of the media data may also be used to search for the same or similar media data previously captured by other users and/or devices, and effects used in such media data. Additionally, user preferences and user information may be used to determine one or more effect for particular media data, including past effects used by the user, user experience in adding effect and/or using image processing application 130, preferences for effect searching by other users and/or media, and/or connections of the user with other online users sharing media.

Once the recommendation is determined and/or received by image processing application 130, the recommendation may be output by image processing application 130 in an interface associated with the media data. The recommendation may highlight or indicate the recommended effect, and may include a notification or alert of the effect. The recommendation may be output as text, images, and/or audio in the interface, and may be provided with the media data to allow the user to apply the effect and see changes to the media data in the interface. If the user selects to keep the effect, the media data may be recorded or edited with the effect, and may be stored to database 116 and/or uploaded to service provider server 140. Where the media data is not local to communication device 110, for example, when residing on service provider server 140 and edited using image processing application 130 accessing service provider server 140, the media data may be requested to be updated, edited, and/or stored with service provider server 140, as well as downloaded by communication device 110. The user may also utilize image processing application 130 to further edit the media data, for example, by adding further effects, which may also be recommended as discussed herein, or by removing effects using one or more processes to remove effect data from the image and restore the image to the initial presentation.

Image sharing application 112 may correspond to one or more processes to execute software modules and associated components of communication device 110 to provide one or more features associated with service provider server 140, including sharing of media content by uploading stored media content, and viewing of other shared media content. In this regard, image sharing application 112 may correspond to specialized hardware and/or software utilized by communication device 110 to provide messaging, social networking, media sharing or viewing, imaging, microblogging, web browsing applications, and/or other types of service. Image sharing application 112 may allow a user to utilize communication device 110 to upload media data stored to database 116, including media data recorded or edited with an effect, to service provider server 140. Additionally, image sharing application 112 may allow a user to browse through media data recorded by other users, as well as view effects used by other users in the media data. Image sharing application 112 may be used to access past effect usage data for one or more other media contents, including other recorded images or videos, which may be used to determine recommendations for effect usage in media data recorded and/or edited using image processing application 130.

One or more of the aforementioned features and/or processes of image processing application 130 may be included within image sharing application 112 or vice versa, for example, to provide their respective features within one application and/or application interface.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other application 114 may include applications, processes, and/or subroutines used for device-to-device communications with other nearby devices, including through short range communication protocol (e.g., Bluetooth, Bluetooth Low Energy, WiFi, LTE Direct, near field communications, radio, etc.), or through accessing a shared network access point, such as a WiFi router, local to an area and communicating through the shared access point.

Other applications 114 may include financial applications, such as banking, transaction processing, and/or payment applications. Other applications 114 may also include location detection applications, which may be used to determine a location for the user, such as a mapping, compass, and/or GPS application, which can include a specialized GPS receiver that obtains location information for communication device 110 and processes the location information to determine a location of communication device 110 and the associated user. Other applications may include merchant applications used for one or more purchases, which may interface and/or include financial applications/processes. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110 capable of conveying information to users.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with image sharing application 112 and/or other applications 114, identifiers associated with hardware of communication device 110, or other appropriate identifiers, such as identifiers used for payment/user/device authentication or identification, which may be communicated as identifying communication device 110 to service provider server 140. Database 116 may include data used by image processing application 130 to add effects to media data, including data for available effects. Such data may correspond to a software routine that adds an effect, changes an appearance, or otherwise alters media data, or may correspond to data necessary to add an effect to media data, such as information for use and/or manipulation of one or more physical lenses or filters. Additionally, recommendations for use of effects determined by one or more of image processing application 130 and/or service provider server 140 may be stored to database 116 prior to and/or after output, which may then be used by image processing application 130 during execution. Where applicable, media data may be stored to database 116, for example, in a library of available media data.

Communication device 110 includes at least one communication module 118 adapted to communicate with service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Service provider server 140 may be maintained, for example, by an online service provider, which may provide one or more services to users. In this regard, service provider server 140 includes one or more processing applications which may be configured to interact with communication device 110 and/or another device/server to provide a platform to store media data, host the media data for viewing and/or retrieval, share the media data, and/or edit the media data using one or more effects. In one example, service provider server 140 may be provided by PAYPAL®, Inc. of San Jose, Calif., USA. However, in other embodiments, service provider server 140 may be maintained by or include another type of service provider.

Service provider server 140 of FIG. 1 includes an image sharing platform 142, other applications 154, a database 156, and a network interface component 158. Image sharing platform 142 and other applications 154 may correspond to executable processes, procedures, and/or applications with associated hardware. In other embodiments, service provider server 140 may include additional or different modules having specialized hardware and/or software as required.

Image sharing platform 142 may correspond to one or more processes to execute software modules and associated specialized hardware of service provider server 140 to provide a service to the user associated with communication device 110, which may include a service used for storing, hosting, sharing, and/or editing media data, such as images or movies. In this regard, image sharing platform 142 may correspond to specialized hardware and/or software to provide one or more services associated with messaging, social networking, media sharing or viewing, microblogging, web browsing, and/or other types of service that may provide media content use services. In various embodiments, image sharing platform 142 may provide one or more of the processes discussed in reference to image processing application 130 of communication device 110. In this regard, communication device 110 may access image sharing platform 142 prior to capturing media data, for example, when attempting to capture media data presented in a viewfinder, or after capture of the media data. Image sharing platform 142 may then be used to transmit recommendations for effects used in image capture and/or editing to communication device 110, or to transmit data used for determination of the recommendations by communication device 110. For example, in some embodiments, image sharing platform 142 may determine a recommendation for an effect as discussed in reference to image processing application 130, for example, using media data and previously recorded media data having one or more effects. In other embodiments, image sharing platform 142 may provide information for previously recorded media data having one or more effects, or data on effects used in the previously recorded media data, to communication device 110 for processing.

Image sharing platform 142 may therefore provide an online portal and/or platform, such as an image sharing website and/or data for use with a dedicated application associated with image sharing platform 142. The online website/data may be used to allow communication device 110 to access image sharing platform, upload image data, and/or access for viewing/output image data stored to database 146. The user associated with communication device 110 may then utilize one or more editing tools, including additional of effects, to edit previously captured media data. The editing may add or remove an effect, where a recommendation for an effect used to edit media data may be determined as discussed in reference to image processing application 130. Once edited, the media data may be stored to database 146 and/or downloaded by communication device 110. Image sharing platform may further make the media data available for viewing by other users, including the public or to connections associated with an account storing and presenting the media data on image sharing platform 142. Image sharing platform 142 may further utilize previously captured and past media data available in database 146 and/or posted to the online portal/platform for viewing to determine recommendations of effects to apply to media data, including information for past used effects in the media data, or may provide the information to communication device 110 for processing. Image sharing platform 142 may also correspond to a server side transaction processing and/or payment application, which may interact with communication device 110, one or more accounts in database 156, and/or another entity's device or server to facilitate processing a transaction and/or making a payment or a transfer. Image sharing platform 142 may receive transaction processing data for the payment/transfer from communication device 110, where the transaction may be processed for one or more services provided by image sharing platform, including image storage and/or editing services. Image sharing platform 142 may also receive image data, as well as associated metadata, from communication device 110 for storage, which may be stored to database 146 and/or hosted on one or more online platforms for retrieval and viewing by other devices, including communication device 110.

In various embodiments, service provider server 140 includes other applications 154 as may be desired in particular embodiments to provide features to service provider server 140. For example, other applications 154 may include security applications for implementing server-side security features, programmatic client applications for interfacing with appropriate application programming interfaces (APIs) over network 150, or other types of applications. Other applications 154 may contain software programs, executable by a processor, including a graphical user interface (GUI), configured to provide an interface to the user when accessing service provider server 140, where the user or other users may interact with the GUI to more easily view and communicate information. In various embodiments, other applications 154 may include connection and/or communication applications, which may be utilized to communicate information to over network 150.

Additionally, service provider server 140 includes database 156. Account and/or user data may be stored in database 156, which may include user information, such as name, address, birthdate, payment instruments/funding sources, additional user financial information, user preferences, and/or other desired user data. Users may link to their respective data through an account, user, merchant, and/or device identifier. Thus, when an identifier is transmitted to service provider server 140, e.g., from communication device 110, user data may be found. Database 156 may also store media data, as well as effects and other editing tools for media data, which may be stored to an account and/or library associated with an account. Thus, the accounts in database 156 may be used to store, host, share, and/or edit media data through communication device 110.

In various embodiments, service provider server 140 includes at least one network interface component 158 adapted to communicate communication device 110 over network 150. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
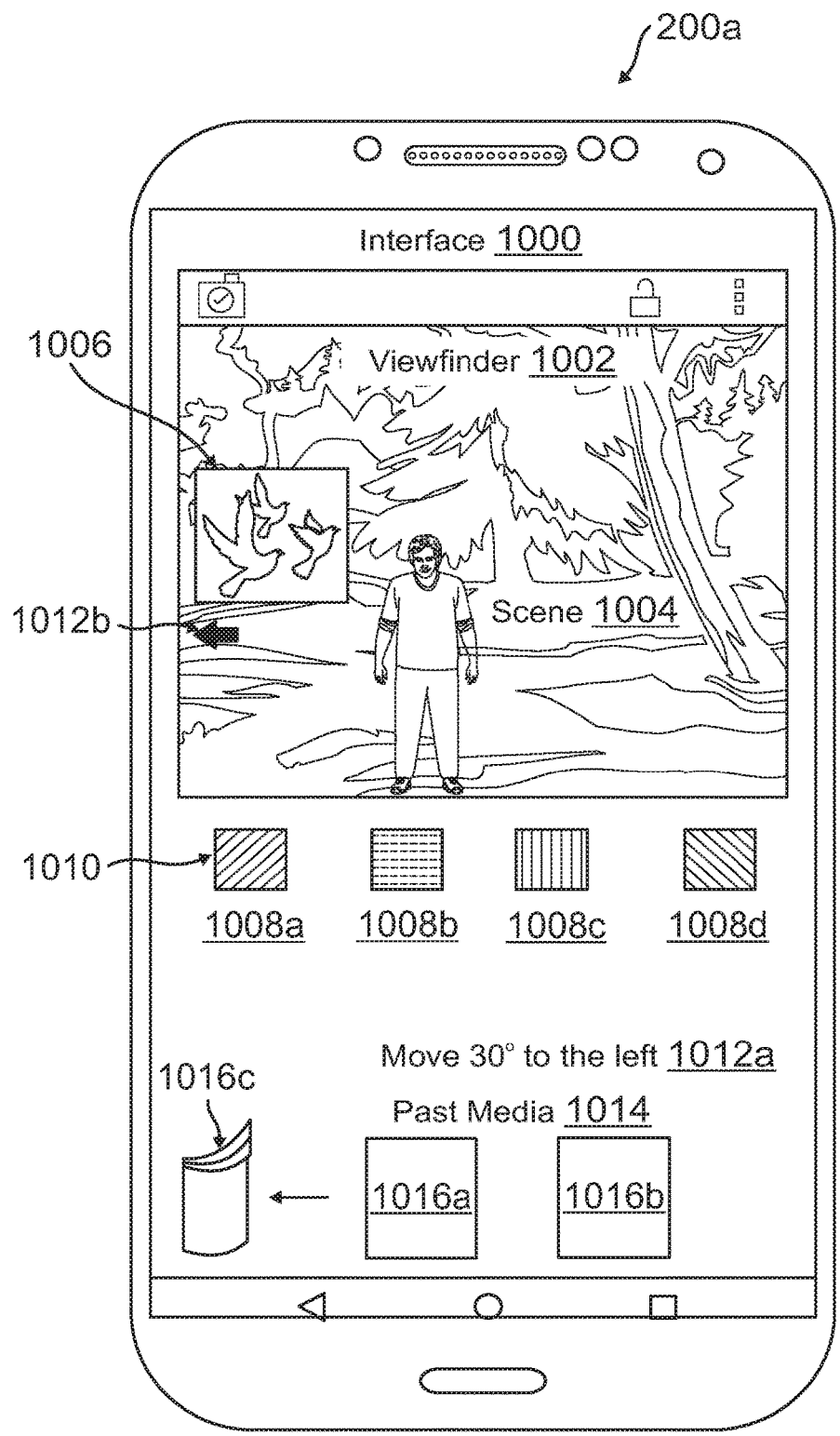
FIG. 2A is an exemplary graphical user interface (GUI) displaying a viewfinder of a camera application recommending particular image effects for a scene prior to image capture, according to an embodiment.

FIG. 2A is an exemplary graphical user interface (GUI) displaying a viewfinder of a camera application recommending particular image effects for a scene prior to image capture, according to an embodiment. Environment 200a of FIG. 2A includes an interface 1000 that may be displayed on a communication device, such as communication device 110 in system 100 of FIG. 1, where interface 1000 displays media data, such as a digital image, through interface 1000 prior to the media data being recorded, for example, when the incoming electromagnetic radiation from a scene is captured using a sensor array of a digital camera prior to recording signals and data for the incoming radiation to a memory. In this regard, interface 1000 may be output using those features and processes provided by one or more of image processing application 130 and/or image sharing application 112 of communication device 110 in system 100 of FIG. 1.

In interface 1000, a viewfinder 1002 is shown as an interface output of incoming data and information captured by a camera, such as a portion of interface 1000 outputting data for detected signals from a sensor array of a digital camera. Thus, viewfinder 1002 may be updated with data for scene 1004 as a user utilizing the device displaying interface 1000 points a camera for the device at scene 1004. Viewfinder 1002 may therefore provide a display of scene 1004 as the potential media data for recording of scene 1004. Scene 1004 is shown with a graphical addition 1006, which may correspond to a stored or available graphic that is added to, placed within, and blended with scene 1004 in the data shown in viewfinder 1002. Thus, graphical addition 1006 may be recorded with the data for scene 1004 when the user elects to record scene 1004 shown in viewfinder 1002. Graphical addition 1006 therefore corresponds to an effect that can be added to scene 1004 based on a user request or addition using interface 1000 and viewfinder 1002.

In order to determine one or more effects to add to scene 1004, interface 1000 may output recommendations for effects. In this regard, interface 1000 includes an effect 1008a, an effect 1008b, and effect 1008c, and an effect 1008d. Each of effects 1008a-d corresponds to a different media capture or editing effect that alters an appearance of scene 1004 when recording the data for scene 1004 in viewfinder 1002, for example, graphical addition 1006 that has already been added to scene 1004 when capturing the data in viewfinder 1002. Interface 1000 may recommend an effect of effects 1008a-d based on various data, including past used effects, data for scene 1004, a location of scene 1004 and/or the device displaying interface 1000, device-to-device communications with other nearby devices that also capture scene 1004 using a media recording device, and/or past media data having one or more effects. As shown in environment 200a, effect 1008a received recommendation 1010 that highlights effect 1008a as the effect that the user should use. Recommendation 1010 may be based on a popular, trending (e.g., increase in use over time), or commonly used effect, or may be based on a new, not recently used, or unique effect. By selecting effect 1008a in interface 1000, effect 1008a may be added to scene 1004 in viewfinder 1002.

Additionally, interface 1000 may display other recommended information. For example, a camera direction recommendation 1012a may also be provided based on past captured media data, nearby device communications with devices also capturing media data of scene 1004, and/or user information. Camera direction recommendation 1012a indicates that the user viewing scene 1004 should move thirty degrees left to capture media data, which is shown as an indicator 1012b in viewfinder 1002. Camera direction recommendation 1012a may be provided so that the user may capture commonly recorded scenes or media data in past media data or by the nearby devices, or so that the user may capture new and unique scenes not captured in previous media data and/or by nearby devices. Interface 1000 may also allow the user to browse past media 1014, which may include an past image 1016a or a past image 1016b, as well as a library 1016c. Past media 1014 may also be used to determine effects used by the user in past media 1014 for use in recommendation 1010.

Figure 2B:
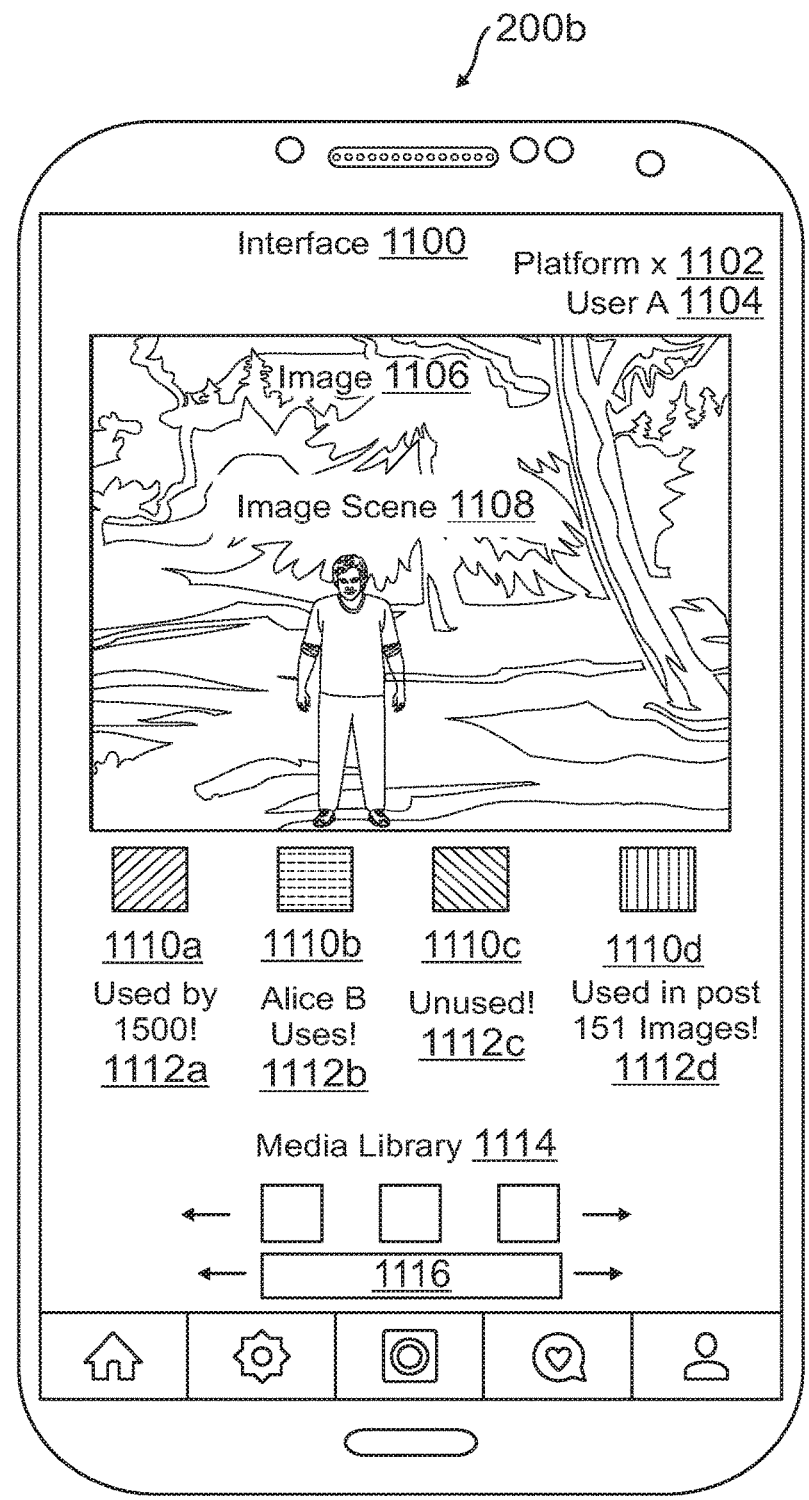
FIG. 2B is an exemplary graphical user interface (GUI) displaying an image sharing platform recommending particular image effects for post-processing of a captured image, according to an embodiment.

FIG. 2B is an exemplary graphical user interface (GUI) displaying an image sharing platform recommending particular image effects for post-processing of a captured image, according to an embodiment. In contrast to FIG. 2A, environment 200b of FIG. 2B may be displayed on a communication device, such as communication device 110 in system 100 of FIG. 1, after recording media data, for example, when accessing an online service provider, such as service provider 140 in system 100 of FIG. 1, to view and edit media data including adding one or more effects to captured media data available with the service provider. In this regard, interface 1000 may be output using those features and processes provided by one or more of image processing application 130 and/or image sharing application 112 of communication device 110 and/or image sharing platform 142 of service provider server 140 in system 100 of FIG. 1.

In interface 1100, the device displaying interface 1100 may receive data received from the online media platform of the service provider, which may be output in interface 1100. For example, interface 1100 includes data for platform X 1102 accessed by the device to retrieve and display media data stored to the service provider, which may be account specific for an account logged in as user A 1104. In other embodiments, the service provider may not be necessary, and platform X 1102 may correspond to an on-device application for editing media and adding effects executed by the device displaying interface 1100. Interface 1100 may display an image 1106 stored to the account for user A 1104, which may include image scene 1108 recorded in image 1106. Utilizing information for past used effects, past media data recorded with effects, image scene 1108, using information for user A 1104, and/or location data for image scene 1108 and/or image 1106, one or more recommendations may be determined and output through interface 1100.

For example, platform X 1102 may allow for editing of image 1106 with an effect 1110a, an effect 1110b, an effect 1110c, and/or an effect 1110d. Effects 1110a-d may each correspond to a post-processing edit effect that can be added to image 1106 to alter an output of image 1106, for example, by adding or blending a graphic to image 1106, adjusting pixel values of image 1106, or otherwise editing image 1106. Each of effects 1110a-d are shown with a corresponding recommendation, where multiple recommendations are determined for use of effects 1008a-d based on different parameters, ratings, and/or past use information of effects 1008a-d. For example, a message 1112a displays that effect 1110a is "used by 1500 people!" Message 1112a therefore indicates effect 1110a is a popular or trending effect. Similarly, a message 1112b displays "Alice B uses!" for effect 1110b, where Alice B may be a popular or celebrity user, or other trendsetter that uses media editing effects. Alice B may also be followed by user A 1104 and indicated as a person that user A 1104 requests tips for use of effects. Conversely, effect 1110c is shown as a new, not recently used, or unique message when a message 1112c displays that effect 1110c is "Unused!" Thus, effect 1110c may be of interest to a user wishing to utilize new, not recently used, or unique effects. Finally, a message 1112d may be used to show that effect 1110d may make a portfolio of images coherent and similar by displaying that effect 1110d is "used in past 15 images!" Thus, the user may view an effect that the user commonly uses. Interface 1100 may also display a media library 1114 for output of image 1106 in interface 1100, where media library 1114 allows a user to browse and select media for editing. Additionally, interface 1100 may include a search field 1116 to allow a user to search for media, effects, or other available service on platform X 1102.

Figure 3:
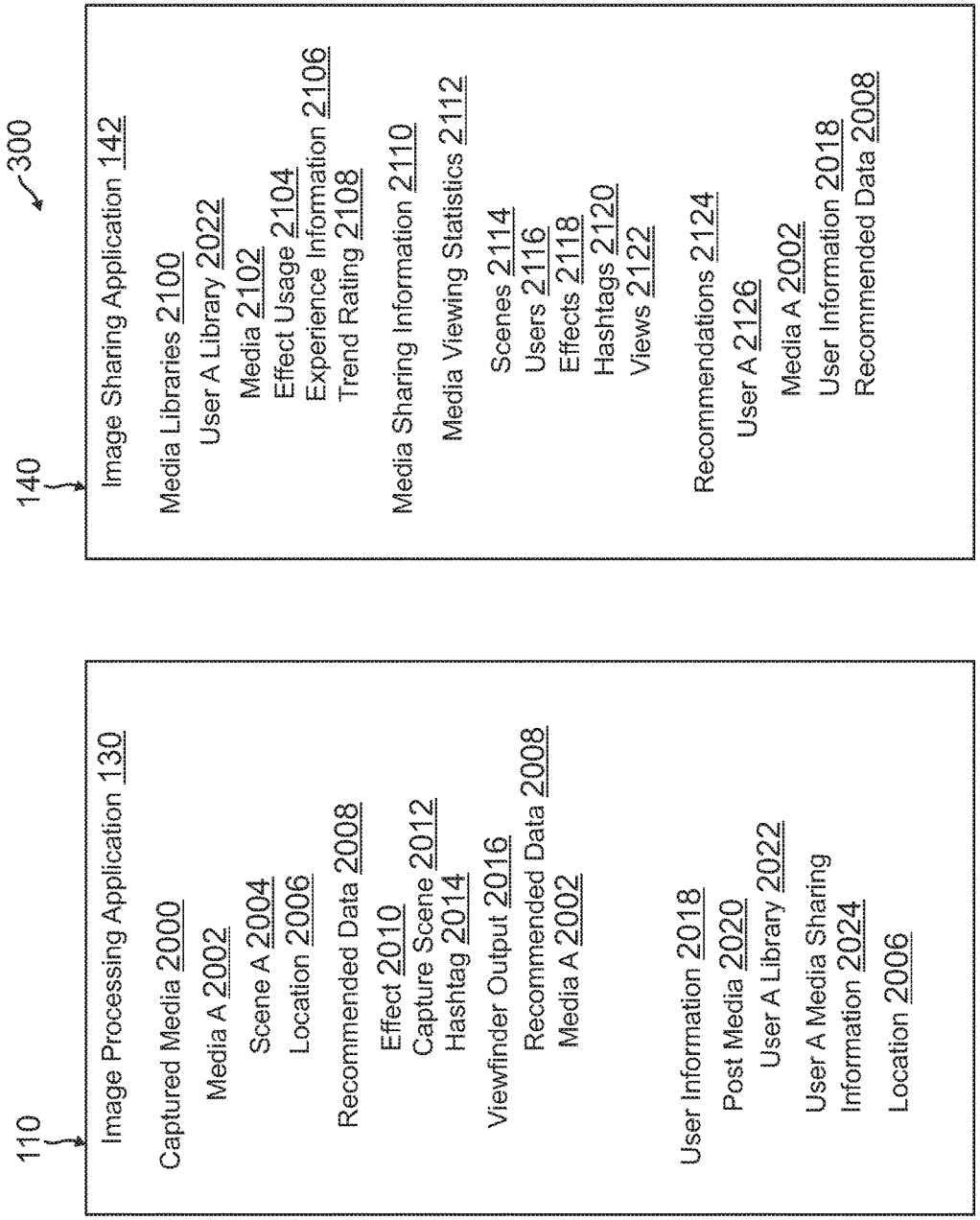
FIG. 3 is an exemplary system environment of a communication device interacting with a service provider server to determine and output recommendations during image capture and post-image processing, according to an embodiment.

FIG. 3 is an exemplary system environment of a communication device interacting with a service provider server to determine and output recommendations during image capture and post-image processing, according to an embodiment. Environment 300 of FIG. 3 includes communication device 110 discussed in reference to system 100 of FIG. 1.

Communication device 110 in environment 300 executes image processing application 130 corresponding generally to the specialized hardware and/or software modules and processes described in reference to FIG. 1. In this regard, image processing application 130 includes data used to capture media content and/or edit media content, including adding effects to media content as the media content is recorded and/or editing recorded media content to include one or more effects. Image processing application 130 therefore includes captured media 2000, which may include media A 2002. Media A 2002 may be for a scene A 2004, such as a real-world physical scene that includes objects, users, or other items. Thus, scene A 2004 may correspond to recorded electromagnetic radiation from a scene that is detected by a camera and recorded using photosensitive film or an array of photo sensors. Media A 2002 may also be associated with a location 2006, such as GPS coordinates or other location data. Captured media 2000 in image processing application 130 may also utilize recommended data 2008 for use with media A 2002, which may include an effect 2010 recommended for media A 2002. Effect 2010 may provide an effect during recording of media A 2002 and/or a post-processing effect after recording.

Recommended data 2008 may include other recommendations, including a capture scene 2012 providing directions for how or where to use the camera to capture media A 2002, including positioning, direction, inclusion or removal of certain objects/users, etc. Recommended data 2008 may further include a hashtag 2014 for uploading and posting of media A 2002. In various embodiments, captured media 2000 may be associated with viewfinder output 2016, which may provide recommended data 2008 with media A 2002 in a viewfinder display to notify a user of recommended data 2008 for use with media A 2002. In order to determined recommended data 2008, image processing application may also access, use, and/or determine user information 2018, which may include past media 2020 captured by the user, such as a user A library 2022, as well as user A media sharing information 2024 for connections with other users that may influence recommended data 2008. User information 2018 may further include location 2006 for the user at the time of capture of media A 2002.

Service provider server 140 in environment 300 executes image sharing application 142 corresponding generally to the specialized hardware and/or software modules and processes described in reference to FIG. 1. In this regard, image sharing application 142 includes uploaded and/or stored media content that may be altered with a media effect, for example, by communication device 110 and/or using a platform provided by image sharing application 142. Image sharing application 142 includes media libraries 2100 for stored media data. Media libraries 2100 may be used to store edited media content having one or more effects, determine recommendations for media effects for other media content, and/or access and edit stored media content. Thus, media libraries 2100 includes user A library 2022, which may be shared with image processing application 130 of communication device 110. User A library 2022 includes media 2102, effect usage 2104, experience information 2106, and trend rating 2108. Each of media 2102, effect usage 2104, experience information 2106, and trend rating 2108 may be used to determine recommendations for the user associated with user A library 2022 and/or other users.

Additionally, image sharing application 142 includes media sharing information 2110, which may include data used to determine recommendations for media processing effects based on processed information for popularity, usage, and/or trendiness of media effects. For example, media sharing information 2110 includes media viewing statistics 2112, which may include statistics for scenes 2114 captured in media content, users 2116 sharing the media content, effects 2118 used in the captured media content, hashtags 2120 used to post media content on a platform associated with image sharing application 142, and/or views 2122 of the media content. Utilizing the aforementioned information accessed by image sharing application 142, recommendations 2124 may be determined, which may include recommended data 2008 for user A 2126 associated with communication device 110 recording media A 2002 and having user information 2018.

Figure 4:
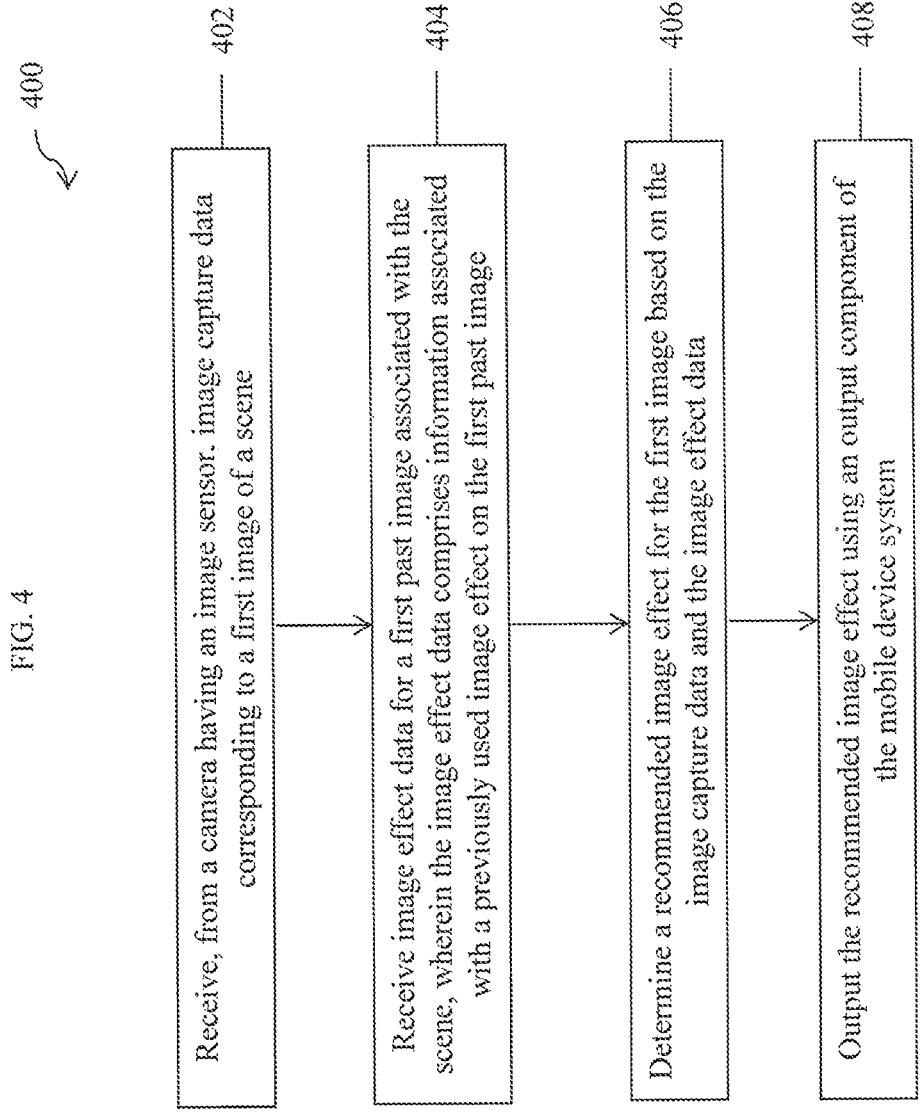
FIG. 4 is a flowchart of an exemplary process for digital image filtering and post-capture processing using user specific data, according to an embodiment.

FIG. 4 is a flowchart of an exemplary process for digital image filtering and post-capture processing using user specific data, according to an embodiment. Note that one or more steps, processes, and methods described herein of flowchart 400 may be omitted, performed in a different sequence, or combined as desired or appropriate.

At step 402 of flowchart 400, image capture data corresponding to a first image of a scene is received from a camera having an image sensor. Image effect data for a first past image associated with the scene is received, wherein the image effect data comprises information associated with a previously used image effect on the first past image, at step 404 of flowchart 400. The information may comprise one of a popularity rating of the previously used image effect, a number of uses of the previously used image effect, a location-specific use of the previously used image effect associated with a location for the scene, or a trending rating of the previously used image effect. The image effect data may further be for a plurality of past images associated with the scene including the first past image and using the previously used image effect, wherein the image effect data is crowd-sourced from a plurality of users capturing the plurality of past images. The image effect data may be received using one of a location of the mobile device system when recording the first image of the scene, a local wireless connection by the mobile device system with another device, or social networking connections of a user associated with the mobile device system on a social networking platform. The first past image may also be recorded by the device associated with the image capture data and stored by the device to a library of images, wherein the recommended image effect comprises the previously used image effect in the first past image. In this regard, a second image may be used to determine the recommended image effect, such as a second image having the effect. The recommended image effect may also be determined using user information for a user associated with the device recording the media capture data and/or in the media capture data, such as a representation or portrayal of the user in the media capture data.

The camera of the device may include an image sensors, where the image sensor comprises an array of light detectors. In such embodiments, the recommended image effect comprises a filter applied post-processing of digital image data for the first image generated using the array of light detectors. For example, the recommended media effect may comprise a software routine that alters the appearance of the real-world scene in the media data. The recommended image effect may also correspond to a lens used with the camera of the device associated with the image capture data. The recommended image effect may also include an audio instruction for using the camera to capture the media capture data, which may be output using an audio output component. The recommended media effect may also blur a portion of a real-world scene in the media capture data based on past images captured of the real-world scene.

At step 406 of flowchart 400, a recommended image effect for the first image is determined based on the image capture data and the image effect data. The recommended image effect may comprise one of an image color filter that applies an adjustment to pixels of the first image or a stored graphical image blended with the first image. In various embodiments, the device having the image capture data may store a first effect and a second effect that change an appearance of one or more images including the first image, wherein the recommended image effect recommends the first effect over the second effect based on usage of one of the first effect or the second effect with the first past image. In such embodiments, the recommended image effect may be limited to those effects available to the device, such as the first and second effect.

The recommended image effect is output using an output component of the mobile device system, at step 408 of flowchart 400. The output component may comprise a display screen of the mobile device system, and the display screen may display a viewfinder interface that comprises the image capture data, as well as a recommendation notification of the recommended image effect. In certain embodiments, the information used to determine the recommended image effect may further comprise a previously used hashtag identifier used with the first past image, wherein the recommendation notification further comprises a hashtag identifier recommendation for posting the first image on an image sharing platform based on the previously used hastag identifier.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
   a camera configured to record a first image of a scene using an image sensor of the camera;
   a non-transitory memory; and
   one or more hardware processors coupled to the non-transitory memory and configured to read instructions from the non-transitory memory to cause the mobile device system to perform operations comprising:
      receiving, from the camera, image capture data corresponding to the first image of the scene;
      receiving image effect data for a first past image associated with the scene, wherein the image effect data comprises information associated with a previously used image effect on the first past image, wherein the information comprises a previously used hashtag identifier associated with the first past image;
      determining a recommended image effect for the first image based on the image capture data and the image effect data, wherein the recommendation image effect comprises a hashtag identifier recommendation for posting the first image based on the previously used hashtag identifier; and
      outputting the recommended image effect using an output component of the mobile device system.

2. The mobile device system of claim 1, wherein the information further comprises one of a popularity rating of the previously used image effect, a number of uses of the previously used image effect, a location-specific use of the previously used image effect associated with a location for the scene, or a trending rating of the previously used image effect.

3. The mobile device system of claim 1, what the recommended image effect comprises one of an image color filter that applies an adjustment to pixels of the first image or a stored graphical image blended with the first image.

4. The mobile device system of claim 1, wherein the output component comprises a display screen of the mobile device system, and wherein the operations further comprise:
   displaying, using the display screen, a viewfinder interface that comprises the image capture data,
   wherein the outputting the recommended image effect comprises:
   displaying a recommendation notification of the recommended image effect in the viewfinder interface.

5. The mobile device system of claim 1, wherein the operations further comprise:
accessing a first effect and a second effect that change an appearance of one or more images including the first image,
wherein the recommended image effect recommends the first effect over the second effect based on usage of one of the first effect or the second effect with the first past image.

6. The mobile device system of claim 1, wherein the image effect data is further for a plurality of past images associated with the scene using the previously used image effect, and wherein the image effect data is crowd-sourced from a plurality of users capturing the plurality of past images.

7. The mobile device system of claim 1, wherein the image effect data is received based on one of a location of the mobile device system when recording the first image of the scene, a local wireless connection by the mobile device system with another device, or social networking connections of a user associated with the mobile device system on a social networking platform.

8. The mobile device system of claim 1, wherein the first past image is recorded by the mobile device system and stored by the mobile device system in a library of images, and wherein the recommended image effect comprises the previously used image effect in the first past image.

9. The mobile device system of claim 1, wherein the operations further comprise:
accessing user information for a user associated with the mobile device system,
wherein the recommended image effect is further determined based on the user information.

10. The mobile device system of claim 1, wherein the output component comprises an audio output component, and wherein the recommended image effect further comprises audio instructions for using the camera to record the first image.

11. The mobile device system of claim 1, wherein the operations further comprise:
receiving a second image of the scene,
wherein the recommended image effect is further determined using the second image.

12. The mobile device system of claim 1, wherein the image sensor comprises an array of light detectors, and wherein the recommended image effect comprises a filter applied post-processing of digital image data for the first image generated using the array of light detectors.

13. A method comprising:
receiving media data captured of a real-world scene from a camera of a device, wherein the camera comprises an array of light detectors;
determining media effects applied to other media associated with the real-world scene, wherein the media effects alter visual presentation of the media data;
determining a first media effect recommended for application to the media data based on the media effects applied to the other media, wherein the first media effect comprises a filter applied post-processing of digital image data for the media data generated using the array of light detectors; and
causing the first media effect to be displayed with the media data by the device.

14. The method of claim 13, wherein the first media effect further comprises a software routine that alters an appearance of the real-world scene in the media data.

15. The method of claim 13, wherein the first media effect is further determined using past images captured of the real-world scene, and wherein the causing the first media effect to be displayed with the media data comprises:
blurring a portion of the real-world scene in the media data based on the past images.

16. The method of claim 13, wherein the other media comprises one of first media captured of the real-world scene, second media of other real-world scenes related to the real-world scene, third media sharing a same hashtag identifier with the media data on a media sharing platform, or fourth media in a media portfolio of a user associated with the device.

17. The method of claim 13, wherein the media data comprises one of a video or an image, and wherein the first media effect further comprises one of a lighting filter applied to the one of the video or the image or an overlay graphic in the image or video of the real-world scene.

18. A non-transitory machine-readable medium having stored thereon machine-readable instructions executable to cause a machine to perform operations comprising:
receiving, from camera associated with a device of a user, image data for an image of a scene;
determining an imaging filter applied to at least one other image associated with the scene by at least one other user;
determining a previously used hashtag identifier used with the at least one other image associated with the scene;
accessing user information for the user;
determining a recommendation for the imaging filter based on the user information, and wherein the recommendation comprises a hashtag identifier recommendation for posting the image data based on the previously used hashtag identifier; and
displaying the recommendation to the user using the device.

19. The non-transitory machine-readable medium of claim 18, wherein the device includes a viewfinder for the camera, and wherein the imaging filter comprises an optical lens of the camera.

20. The mobile device system of claim 1, wherein prior to receiving the image effect data, the operations further comprise:
determining the first past image from a plurality of past images based on user responses to the first past image.

* * * * *